United States Patent [19]

Takabayashi et al.

[11] Patent Number: 4,660,980
[45] Date of Patent: Apr. 28, 1987

[54] APPARATUS FOR MEASURING THICKNESS OF OBJECT TRANSPARENT TO LIGHT UTILIZING INTERFEROMETRIC METHOD

[75] Inventors: Hitoshi Takabayashi, Hachioji; Takahiro Nakamura, Atsugi, both of Japan

[73] Assignee: Anritsu Electric Company Limited, Tokyo, Japan

[21] Appl. No.: 679,899

[22] Filed: Dec. 10, 1984

[30] Foreign Application Priority Data

Dec. 13, 1983 [JP] Japan ............................... 58-233728

[51] Int. Cl.$^4$ .............................................. G01B 9/02
[52] U.S. Cl. ............................................................. 356/357
[58] Field of Search ............... 356/345, 350, 351, 355, 356/356, 357, 358, 363, 381, 382; 364/525, 563

[56] References Cited

U.S. PATENT DOCUMENTS

| | | | |
|---|---|---|---|
| 2,999,944 | 9/1961 | Laycac | 364/563 X |
| 3,645,625 | 2/1972 | Patten | 356/381 X |
| 3,824,017 | 7/1974 | Galyon | 356/357 |
| 4,377,343 | 3/1983 | Monson | 356/357 |
| 4,533,250 | 8/1985 | Callaghan et al. | 356/350 |

FOREIGN PATENT DOCUMENTS

| | | | |
|---|---|---|---|
| 0003363 | 1/1978 | Japan | 356/357 |
| 54-155861 | 12/1979 | Japan | . |
| 0022902 | 4/1981 | Japan | 356/381 |
| 58-139006 | 8/1983 | Japan | . |

OTHER PUBLICATIONS

"Rectangular Grid Fring Pattern for Topographic Applications", Taboada et al, *Applied Optics*, 3-1976, pp. 597-599.
Si Wafer Thickness Measurement Using Infrared Lichtshnitt Method-Shingaku Giho, vol. 81, 1981, pp. 9-15, by A. Sawada et al.
Thickness Measurement of Plastic Film by Infrared Sensor-Sensor Gijutsu, vol. 2, No. 7, Jun. 1982, pp. 45-51, (in Japanese language), by M. Sawaguti.
Construction of an Interferometric Gauge System for Thickness Measurement in White Light-Goedgebuer, Lacourt, Guignard, "Optics and Laser Technology", Aug. 1978, pp. 193-196.

*Primary Examiner*—Davis L. Willis
*Assistant Examiner*—S. A. Turner
*Attorney, Agent, or Firm*—Frishauf, Holtz, Goodman & Woodward

[57] ABSTRACT

An apparatus for measuring a thickness of an object transparent to light utilizing an interferometric method includes a light source for generating a coherent light beam to which an object to be measured is transparent, an illumination unit for radiating onto the object the incident light beam as scanned over a range of angle of incidence varying from a predetermined angle of incidence $\theta_A$ to another predetermined angle of incidence $\theta_B$, and a photosensor unit for detecting light intensity changes resulting from changing of the optical path difference between two light beams reflected by the upper and lower surfaces of the object. A count circuit receives an output signal from the photosensor unit and counts the difference between an order of interference fringes obtained for one scan of incident light beam having the predetermined angle of incidence $\theta_A$ to that having the other predetermined angle of incidence $\theta_B$, and a calculating circuit converts the output from the count circuit into a value corresponding to the thickness of the object.

11 Claims, 11 Drawing Figures

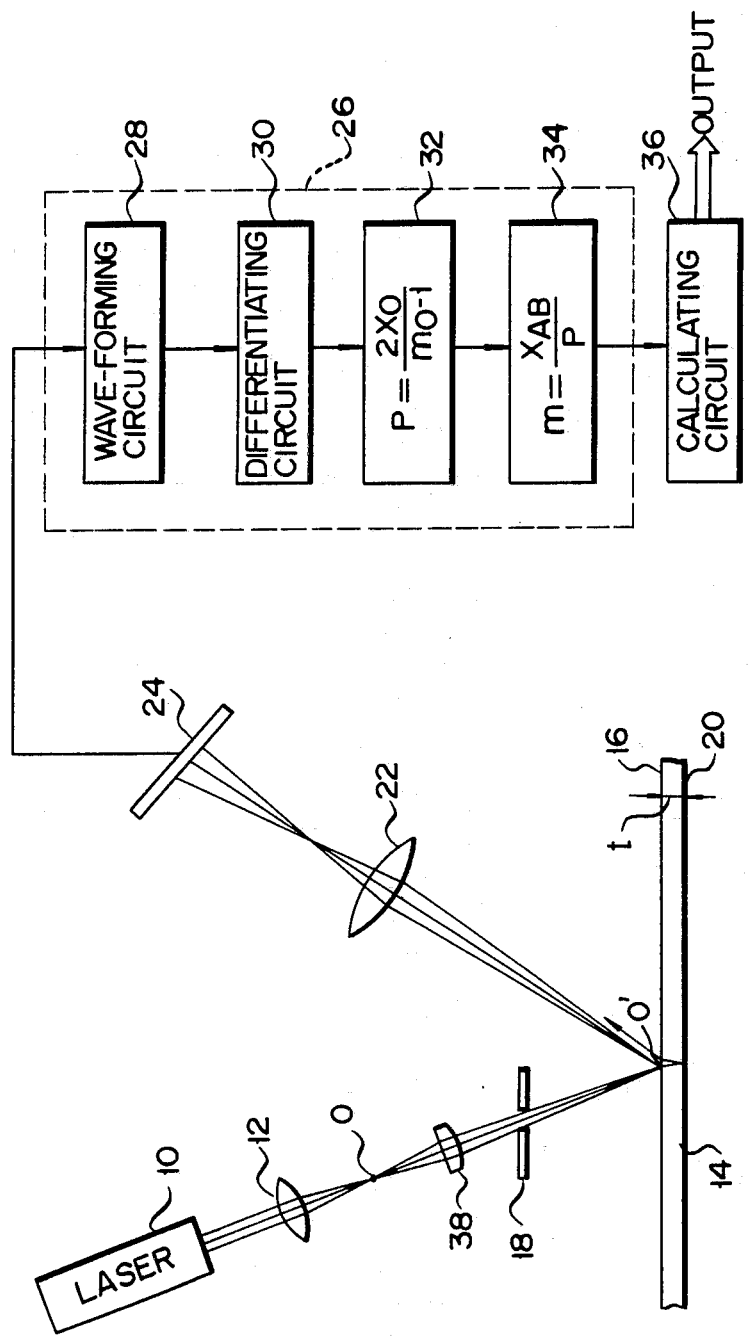

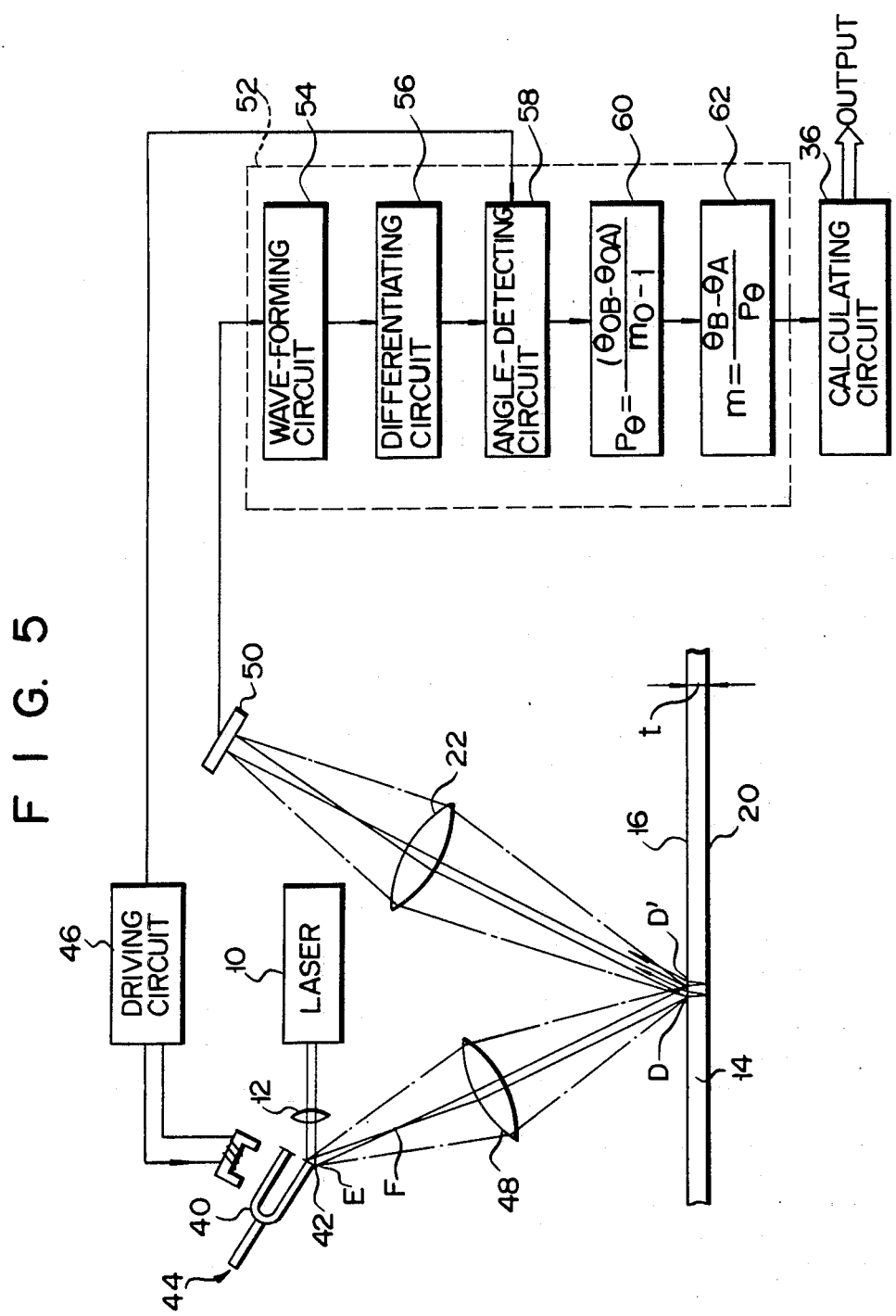

APPARATUS FOR MEASURING THICKNESS OF OBJECT TRANSPARENT TO LIGHT UTILIZING INTERFEROMETRIC METHOD

BACKGROUND OF THE INVENTION

The present invention relates to a thickness measuring apparatus for precisely measuring in nondestructive testing a thickness of a transparent body by an interferometric method, especially, the thickness of a very thin film.

A conventional thickness measuring method is known wherein a thickness of a very thin film is measured in accordance with a transmissivity of $\beta$-rays or X-rays. However, with this method, there are safety problems. Another known conventional thickness measuring method is an inexpensive measuring method wherein two infrared rays having different wavelengths are transmitted through an object to be measured and a thickness of the object is measured in accordance with a ratio of the attenuation rates of these infrared rays. This method is described by M. Sawaguti, in "Thickness Measurement of Plastic Film by Infrared Sensor," *Sensor Gijutsu,* Vol. 2, No. 7, June 1982, pp. 45–51. However, this method cannot provide a high precision measurement. Still another thickness measuring method is described in Japanese Patent Disclosure (KOKAI) No. 58-139006 wherein a thickness of a thin film is measured by a phase difference between transmitted light and nontransmitted light.

Still another thickness measuring method is described by A. Sawada et al., in "Si Wafer Thickness Measurement Using Infrared Lichtshnitt Method," *Shingaku Giho* Vol. 81, No. 45 (EMC81-45), 1981, pp. 9–15. A conventional thickness measuring method using an interferometric gauge is described by J. P. Goedgebuer et al., in "Construction of an interferometric gauge system for thickness measurement in white light," Optics and Laser Technology, August 1978, pp. 193–196.

A method of measuring changes in the thickness of a glass plate by utilizing optical interference is described in Japanese Patent Disclosure (KOKAI) No. 54-155861. According to this method, (a1) a laser beam is irradiated on a surface of a transparent plate, (a2) interference fringes are formed by optical components reflected by the upper and lower surfaces of the plate, (a3) the plate is moved relative to a light source and a photodetector, and (a4) a moving direction of the interference fringes and an increase/decrease in the order of interference are detected, thereby continuously measuring a change in the thickness of the plate upon radiation of the beam.

According to this method, although the change in thickness of the plate can be measured, an absolute value of the thickness cannot, resulting in inconvenience.

SUMMARY OF THE INVENTION

It is an object of the present invention to provide a thickness measuring apparatus for precisely measuring a thickness of a relatively thin object in nondestructive testing without moving a detector.

In order to achieve the above object of the present invention, there is provided a thickness measurement apparatus comprising a light source for generating a coherent light beam to which an object to be measured is transparent, an illumination unit for radiating onto the object the light beam so as to have a range of angle of incidence varying from a predetermined angle of incidence $\theta_A$ to another predetermined angle of incidence $\theta_B$, a photosensor unit for detecting a pattern of interference fringes formed by superposing two light beams reflected by the upper and lower surfaces of the object, a count circuit for receiving an output signal from the photosensor unit and counting a difference between an order of interference fringes of the incident light beam having the predetermined angle of incidence $\theta_A$ and that having another predetermined angle of incidence $\theta_B$, and a calculating circuit for converting an output from the count circuit into a value corresponding to the thickness of the object.

The illumination unit may comprise a deflecting means for scanning the light beam at a predetermined angle range and producing a deflected light beam, and an illumination means for irradiating the deflected light beam as a substantially parallel light beam onto the object at the range of angles of incidence continuously varying from the predetermined angle of incidence $\theta_A$ to another predetermined angle of incidence $\theta_B$.

With the arrangement described above, a thickness of the object can be accurately measured in nondestructive testing without moving the object.

BRIEF DESCRIPTION OF THE DRAWINGS

Other objects and advantages will be apparent from the following description taken in conjunction with the accompanying drawings, in which:

FIGS. 4 and 5 are schematic views of thickness measuring apparatuses according to other embodiments of the present invention;

DETAILED DESCRIPTION OF THE PREFERRED EMBODIMENTS

Figure 1:
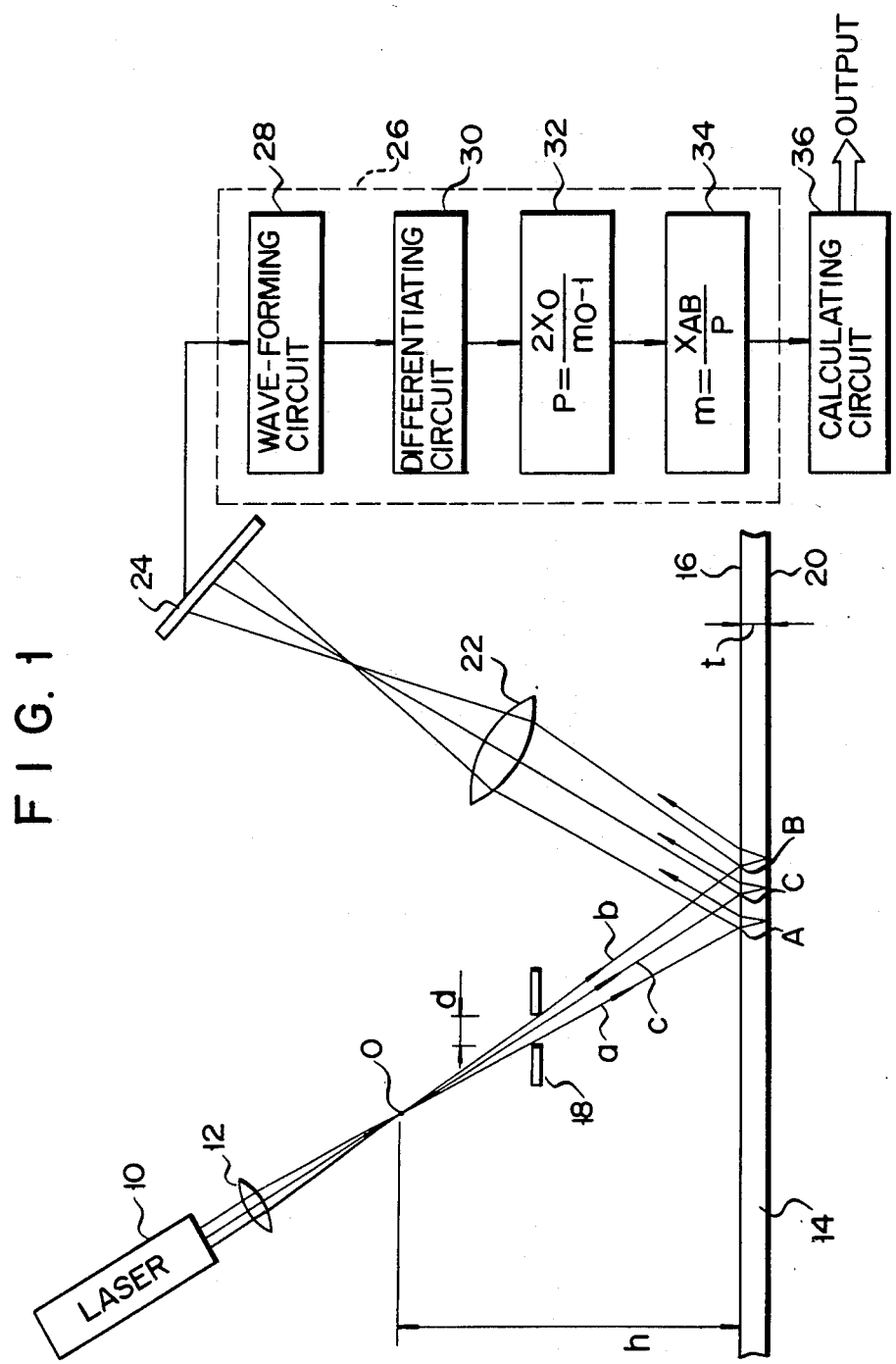
FIG. 1 is a schematic view of a thickness measurement apparatus according to a first embodiment of the present invention.
Figure 2:
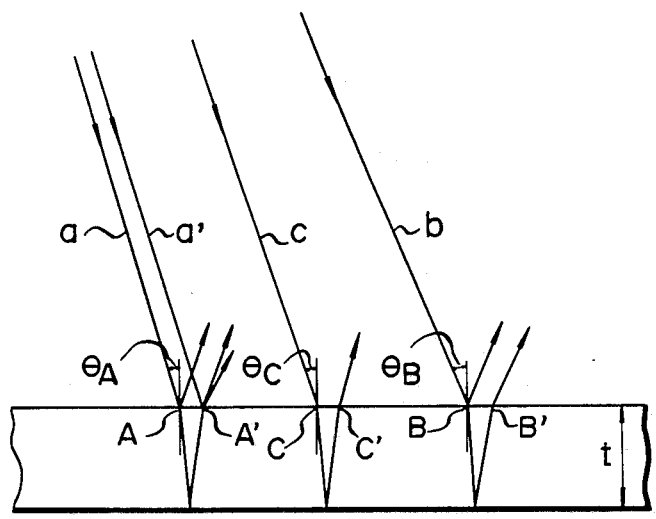
FIG. 2 is an illustration showing light beams in the vicinity of the object to be measured by the apparatus of FIG. 1.

A thickness measuring apparatus according to a first embodiment of the present invention will be described with reference to FIGS. 1 and 2. A coherent light whose coherence length is a few times greater than the thickness of an object 14 is generated from a light source 10, for example, a laser, LED (light emitting diode) or other monochromatic light source. In the first embodiment, a laser is used. A coherent laser beam is focused by a lens 12, and a beam waist of the laser beam is formed at point 0. The laser beam irradiates a surface 16 of the transparent object 14 to be measured. In this case, angles of incidence $\theta_A$ and $\theta_B$ of the light beams radiated on the surface 16 of the object are determined by using a stop 18. The angles of incidence $\theta_A$ and $\theta_B$ are determined by a distance h between the surface 16 of the object 14 and point 0, a position of the stop 18 and a stop width d. Assume interference fringes are produced by superposing two light beams reflected by the upper surface 16 and a lower surface 20 of the object within an area defined by incident points A and B of the light beam. Such interference is called interference of equal inclination. A lens 22 is arranged in an optical path of light beams reflected by the surfaces of the object 14 so as to form interference fringes in the vicinity of the upper surface 16 of the object 14 on a photosensor such as an image sensor 24, thereby detecting the pattern of the interference fringes. In this case, even if the position of the object 14 changes, the focusing system should be adjusted to constantly form the pattern image on the image sensor 24. An interference fringe signal obtained by tracing peaks of video signals from the image sensor 24 is used to measure the thickness of the object 14. Note that the image sensor 24 comprises at least one array of photosensors aligned along a direction perpendicular to the interference fringes, and that the length of a light-receiving surface of each photosensor along the interference fringe direction is sufficient to detect the interference fringes.

The thickness of the object 14 can be measured in accordance with the interference fringe pattern in the following manner. Referring to FIG. 2, the light beams having the range of incident angles $\theta_A$ to $\theta_B$ are incident on the surface 16 of the object 14 between points A and B. Assume that the light beam having the angle of incidence $\theta_A$ is defined as a, and that the light beam a is transmitted through the upper surface 16 of the object 14, reflected by the lower surface 20 thereof, and is transmitted again through the surface 16 at point A'. In this case, the light beam being transmitted through point A' meets a light beam a'. The light beam a' interferes with the light beam a. Generally speaking, interference occurs at every point between points A' and B. A phase difference between the two interfering light beams monotonically changes in accordance with a change in angle of incidence from the angle $\theta_A$ to the angle $\theta_B$. Interference fringes having a monotonically changing order of interference appear between points A' and B. An average angle of incidence $\theta_C$ is set such that the maximum number of interference fringes per unit incident angle is produced, that is, the number of interference fringes appearing between points A' and B is maximum. Strictly speaking, only one light beam is present between points A and A' and between points B and B', so interference fringes will not appear in these areas. When the thickness t of the object 14 is very small, however, the areas between points A and A' and between points B and B' are disregarded. Therefore, the area between points A' and B can be substituted with that between points A and B. A difference m in the order of interference fringes appearing between points A and B is represented by equation (1):

$$m = (l_A - l_B)/\lambda \tag{1}$$

where $l_A$ is the optical path difference between the interfering light beams at point A, $l_B$ is the optical path difference between the interfering light beams at point B, and $\lambda$ is the wavelength of the laser beam.

In the case where the thickness of the object is not uniform, it is very difficult to accurately calculate the optical path differences $l_A$ and $l_B$ and to find a relationship between the optical path differences $l_A$ and $l_B$ and the thickness t. When the object 14 is sufficiently thin, the two interfering light beams a and a' at the incident point A on the upper surface 16 of the object can be regarded as parallel beams without causing an error. In this case, the optical path difference $l_A$ between the two interfering beams is calculated as follows:

$$l_A = 2 \times \sqrt{n^2 - \sin^2\theta_A} \times t \tag{2}$$

where n is the refractive index of the object. A similar equation can be derived from the optical path difference $l_B$ where:

$$l_B = 2 \times \sqrt{n^2 - \sin^2\theta_B} \times t \tag{3}$$

Equations (1), (2) and (3) yield the following proportional relationship between the difference m in the order of interference fringes and the thickness t of the object:

$$t = [\lambda/\{2(\sqrt{n^2 - \sin^2\theta_A} - \sqrt{n^2 - \sin^2\theta_B})\}] \times m \tag{3}$$

When the refractive index n of the object and the wavelength $\lambda$ of the laser beam are known, the difference m in the order of interference fringes can be detected in accordance with the interference fringes appearing on the upper surface of the object, thereby allowing the thickness t of the object to be calculated.

Figure 3A:
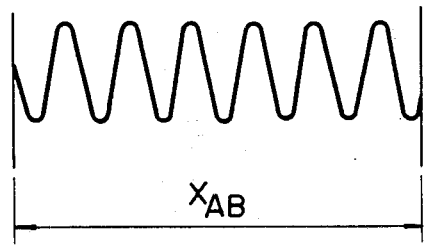
FIGS. 3A through 3C are timing charts showing an interference fringe signal obtained by tracing the peaks of a video signal from an image sensor of FIG. 1, a waveshaped signal, and a differentiated signal, respectively.
Figure 3B:
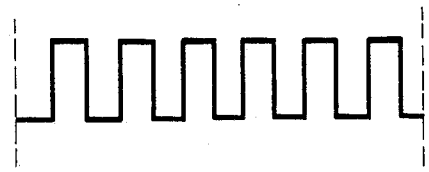
Figure 3C:
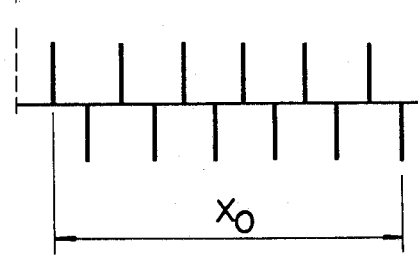

A method of calculating a difference m in the order of interference of the interefence fringes will be described with reference to FIG. 1 and FIGS. 3A, 3B and 3C. FIG. 3A shows an interference fringe signal obtained by tracing peaks of the video signals from the image sensor 24. A count section 26 counts the number of interference fringe signals. The count section 26 will be described in detail. The interference fringe signal is converted by a wave-shaping or wave-forming circuit 28 to a rectangular wave signal, as shown in FIG. 3B. Positive- and negative-going pulses are generated by a differentiating circuit 30, as shown in FIG. 3C. A calculating circuit 32 calculates an average interval P between the interference fringes in accordance with a total pulse number $m_0$ obtained from the differentiating circuit 30 and a distance $x_0$ between the interference fringes obtained by positions of the and pulses.

$$P = 2x_0/(m_0 - 1) \tag{5}$$

A difference m in the order of interference fringes of the images corresponding to positions A and B on the image sensor 24 is calculated by a calculating circuit 34 in accordance with equation (6) since the interference fringe pitch does not substantially change with a slight change in the angle of incidence:

$$m = X_{AB}/P = X_{AB}/X_0 \times (m_0 - 1)/2 \tag{6}$$

where $X_{AB}$ is the length between the images corresponding to incident points A and B.

When a calculating circuit 36 is operated in accordance with equation (4), the thickness t of the object 14 is obtained. The range of the angle of incidence is selected such that an angle $(\theta_B - \theta_A)$ is constant, and the average incident angle $\theta_C$ is selected such that value m in equation (1) is maximum. Under these conditions, the measured value is stable even if the object 14 vibrates or is inclined.

In the first embodiment, the light beam irradiating the upper surface 16 of the object 14 comprises a diverging light beam, but may be extended so as to include a focused light beam. The object 14 may be located in the vicinity of a beam waist. In this first embodiment, the lens 22 is arranged in an optical path of the reflected beam, and the interference fringes formed in the vicinity of the upper surface 16 of the object 14 are projected onto the image sensor 24. However, when the upper and lower surfaces of the object 14 are smooth, the lens 22 need not be used, and the interference fringes may be directly detected by the image sensor 24. Moreover, it is more preferable to use an s-polarized light as a light beam, thereby increasing the reflectivity of the incident light beam and the signal intensity. A best incident angle is close to the Brewster angle. When the refractive index n of the object is 1.5, the best incident angle is 49.2 degrees.

A second embodiment will be described with reference to FIG. 4. The second embodiment is substantially the same as the first embodiment, except that a cylindrical lens 38 is inserted in the illumination system and that an elongated linear light beam is line-focused, in a direction perpendicular to the plane of incidence, on an upper surface 16 of the object 14. The incident light beam is focused by the cylindrical lens 38, and a beam waist is formed at point 0' on the upper surface 16 of the object 14, thereby reducing the influence of the speckle effect inherent to the laser and small dust particles on the surface of the object subjected to measurement. The beam waist formed at point 0' is represented by a dot on the drawing. However, in practice, the beam spot has a larger width than the thickness t of the object 14. Therefore, the interference fringes formed by interference of equal inclination can be formed on the image sensor 24. As apparent from FIG. 4, the image formed on the image sensor 24 is not actually formed on the surface of the object but at a location slightly away from the surface. This achieves averaging of thickness distribution of the object to be measured. Furthermore, even if small dust particles are present on the upper surface 16 of the object 14, proper measurement still can be performed. Other arrangements of the second embodiment are the same as those of the first embodiment. The same reference numerals as in the first embodiment denote the same parts in the second embodiment, and a detailed description thereof has been omitted.

A measuring system according to a third embodiment of the present invention will be described with reference to FIGS. 5 and 6A through 6C. In the third embodiment, unlike in the first embodiment wherein the angle of incidence varies between $\theta_A$ and $\theta_B$ and the light beams between the angles of incidence $\theta_A$ and $\theta_B$ simultaneously irradiated the surface of the object 14, the upper surface of the object is sequentially scanned within the range of angles $\theta_A$ to $\theta_B$ to obtain the same effect as in the first embodiment.

Figures 6A, 6B, 6C:
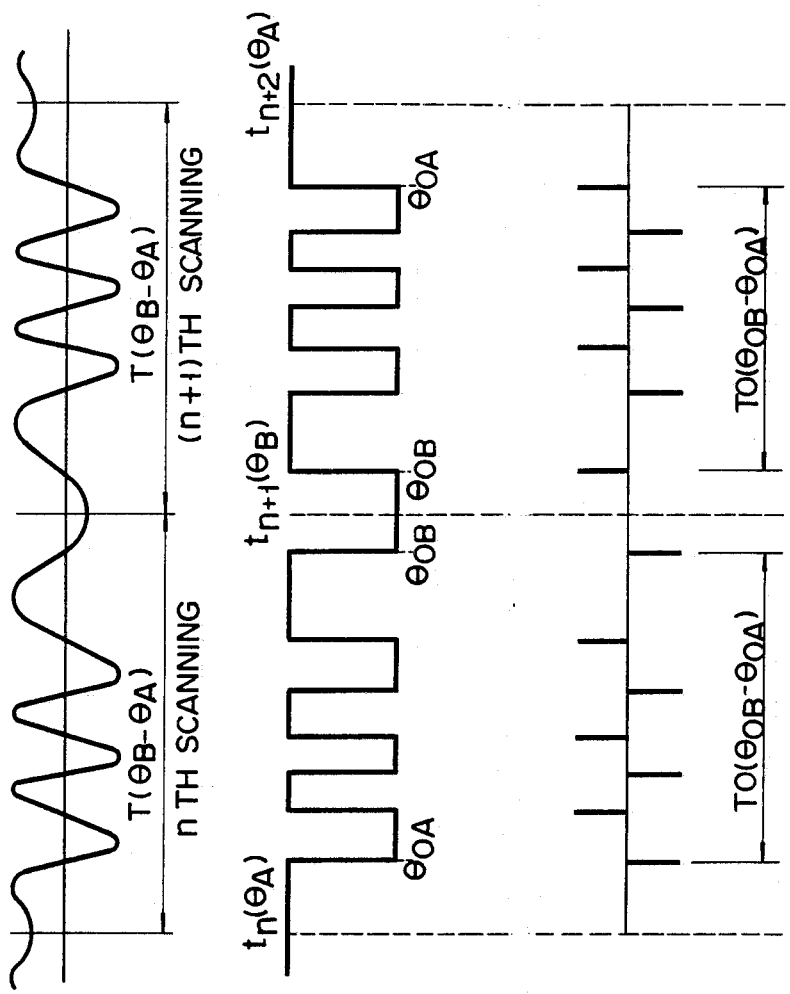
FIGS. 6A through 6C are timing charts showing a signal from the photosensor in the embodiment of FIG. 5, a waveshaped signal, and a differentiated signal.

A laser beam is focused by a lens 12. A tuning fork deflector 44 is arranged between the lens 12 and focal point F. In the deflector 44, a mirror 42 is mounted at a distal end of a tuning fork 40. The deflector 44 is driven by a driving circuit 46. In order to illuminate a small portion on the surface 16 of the object 14, a lens 48 is arranged so as to have a common focal point F with the lens 12. An image at a reflecting point E on the deflector 44 is formed at points D and D' on the surface 16 of the object 14. The incident light becomes parallel or substantially parallel beams and changes in incident angles. The images at points D and D' are formed on a photosensor 50 for detecting an intensity of light. The photosensor 50 comprises a photo-diode whose output is proportional to an incident light intensity. A signal from the photosensor 50 is similar to that in FIG. 3A, but the scanning time is plotted along the abscissa. The abscissa also corresponds to the scanning angle. The signal generated by the photosensor 50 is illustrated in FIG. 6A. This signal is supplied to a count section 52 which then calculates a difference in the order of interference fringes. As shown in FIG. 6B, the signal (FIG. 6A) from the photosensor 50 is converted by a waveforming or wave-shaping circuit 54 to a rectangular wave signal. The circuit 54 comprises a high-pass filter and a Schmitt trigger circuit. The rectangular wave signal is supplied to a differentiating circuit 56 and is converted to positive- and negative-going pulses (FIG. 6C). These positive- and negative-going pulses are supplied to an angle-detecting circuit 58. The angle-detecting circuit 58 calculates a difference ($\theta_{0B} - \theta_{0A}$) between the angles corresponding to the first and last pulses during one scanning cycle. The difference is obtained by monitoring a phase of the tuning fork 40.

During scanning of the tuning fork 40, the angle of incidence continuously changes, but the angular velocity changes sinusoidally. The average angle $P_\theta$ per fringe is given in correspondence with equation (5) as follows:

$$P_\theta = 2(\theta_{0B} - \theta_{0A})/(m_0 - 1) \tag{7}$$

where $m_0$ is the number (integer) of all differentiated pulses generated during one scanning cycle. As apparent from FIGS. 6A through 6C, the angles $\theta_{0A}$ and $\theta_{0B}$ appear alternately for every scanning. An output signal $\theta_{0B} - \theta_{0A}$ from the angle-detecting circuit 58 is supplied to a calculating circuit 60 which performs the operation in accordance with equation (7) to obtain the average angle $P_\theta$. Subsequently, a calculating circuit 62 calculates the difference m in the order of interference fringes during one scanning cycle in the following manner:

$$m = (\theta_B - \theta_A)/P_\theta = \{(m_O - 1)(\theta_B - \theta_A)\}/2(\theta_{OB} - \theta_{OA}) \tag{8}$$

wherein the angles $\theta_A$ and $\theta_B$ are predetermined and thus known. Substitution of equation (8) into equation (4) by the calculating circuit 36 yields the thickness t.

Other arrangements in the third embodiment are the same as those in the first embodiment. The same reference numerals as in the first embodiment denote the same parts in the third embodiment, and a detailed description thereof has been omitted.

Since the incident light beams scanned by the deflector 44 are parallel beams or substantially parallel beams, values obtained by equations (2) and (3) are very accurate. The average angle of incidence of the beams scanned by the deflector 44 is preferably determined such that the difference m in the order of interference fringes is maximum at a predetermined range of angles $\theta_B$ to $\theta_A$ in the same manner as in the first embodiment.

In this embodiment, the deflector 44 comprises the tuning fork 40 but may comprise a rotational mirror or a member for forming an image of the reflecting point E to be radiated in the vicinity of the upper surface 16 of the object 14. In addition to this modification, the position of the object 14 may be located sufficiently in front of the image at the reflecting point E, and the lenses 12 and 48 may be removed.

Figure 7:
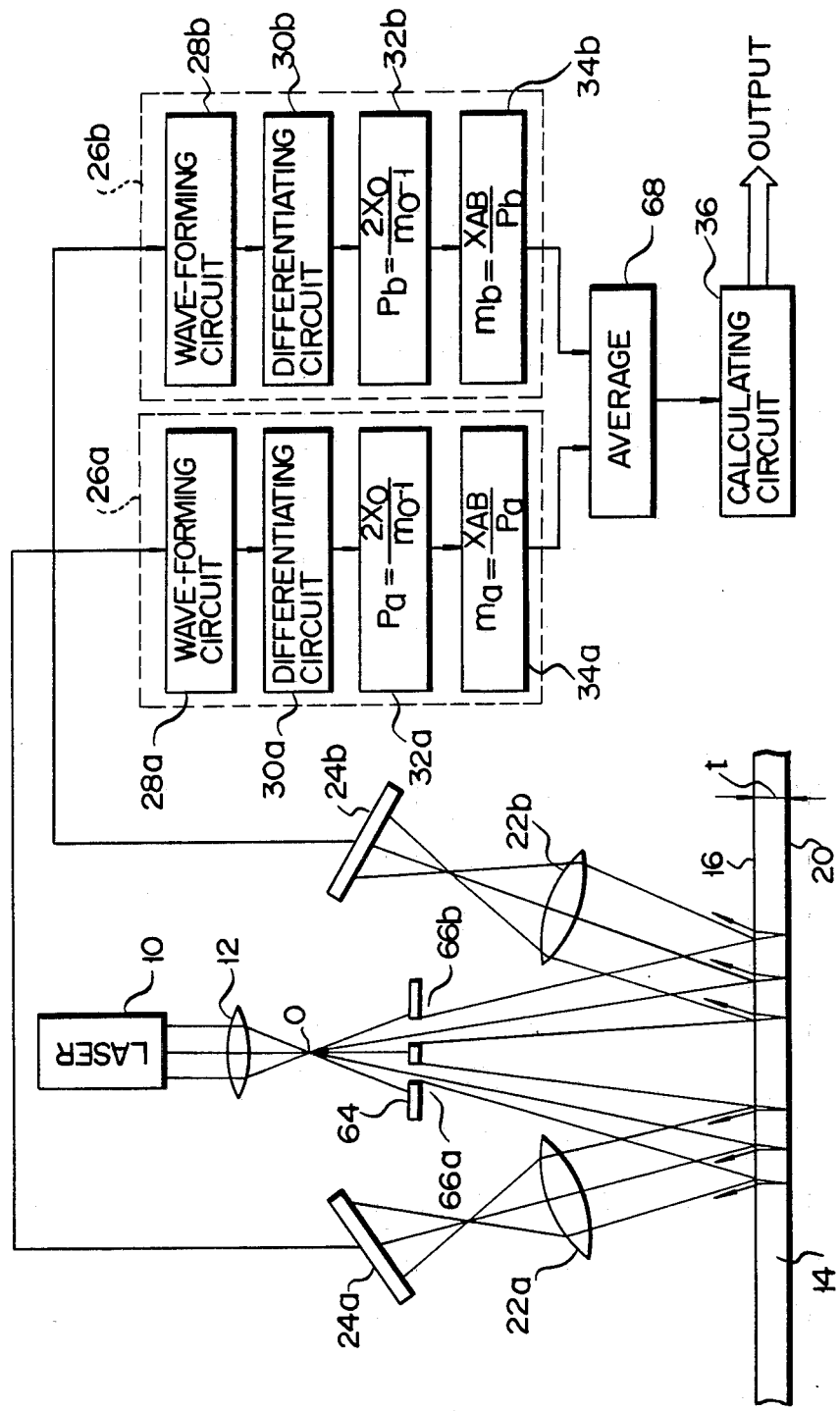
FIG. 7 is a schematic view of a thickness measuring apparatus according to still another embodiment of the present invention.

A thickness measuring apparatus according to a fourth embodiment of the present invention will be described with reference to FIG. 7. The optical system in FIG. 7 is used when the thickness t of the object 14 is increased. A laser beam emitted from a laser 10 is focused at point 0 through a lens 12 and is transmitted through a stop 64. The stop 64 has two apertures 66a and 66b. The incident laser beam is split by the apertures 66a and 66b. The two beams formed in this manner are incident on an upper surface 16 of an object 14 at a small angle of incidence to be symmetrical with regard to a normal to the surface 16 of the subject 14. Each laser beam is reflected by the upper surface 16 and a lower surface 20. The laser beam reflected by the surfaces 16 and 20 is supplied to an image sensor 24a through a lens 22a. The image sensor 24a generates a video signal representing the interference fringes. The video signal is supplied to a count section 26a. A difference $m_a$ in an order of interference fringes is calculated by a wave-shaping or wave-forming circuit 28a, a differentiating circuit 30a, and calculating circuits 32a and 34a. The other laser beam is also reflected by the upper and lower surfaces 16 and 20, and the beam reflected thereby is supplied to an image sensor 24b through a lens 22b. The image sensor 24b generates a video signal representing the interference fringes. The video signal is supplied to a count section 26b, and a difference $m_b$ in an order of interference fringes is calculated by a wave-shaping or wave-forming circuit 28b, a differentiating circuit 30b, and calculating circuits 32b and 34b. The differences $m_a$ and $m_b$ are averaged by an average value circuit 68. An output signal from the average value circuit 68 is supplied to a calculating circuit 36, which generates a signal representing a thickness t of the object 14.

This embodiment has the following advantage. When the average incident angle is small and is not optimal and when the object is inclined with respect to the optical system of the thickness measurement apparatus, the measured values obtained by the different light beams are different. However, when such an inclination is small, the differences can cancel each other by averaging the measured values. Therefore, the thickness t is accurately measured.

According to the present invention, the following advantages are obtained:

(1) The thickness of the object to be measured can be measured in nondestructive testing without moving the object.

(2) Where the light beam irradiating the object 14 comprises a diverging beam or a focused light, or where the object 14 is located in the vicinity of the beam waist, the stops 18 and 64 are inserted in the optical path of the incident light beam to determine the range of angles of incidence. Therefore, if the light beam can be incident on the photosensors 24 and 50, the optical path difference 1 does not change even if the distance h between point 0 as the light source and the object 14 changes within a predetermined range. This is demonstrated by the fact that the equation (4) representing a relationship between the thickness t of the object 14 and the total number $m_0$ of interference fringes within a measuring range does not include the distance h.

(3) When the dimension of the image sensor is substantially great along the direction perpendicular to the arranging direction of elements constituting the image sensor 24, the influence of a speckle inherent to the laser and superposed on the interference fringes can be eliminated.

(4) When the object 14 is located in the vicinity of the beam waist of the light beam and the cylindrical lens 38 is arranged in the optical path to focus the beam perpendicularly to the plane of incidence 16, the influences of the speckle effect inherent to the laser and small dust particles on the measuring surface can be reduced.

(5) The average angle of incidence $\theta_C$ is set such that a maximum number of interference fringes are formed when angles $\theta_A$ and $\theta_B$ of the light beams a and b are predetermined. Therefore, a rate of change in the number of interference fringes due to the inclination of the object 14 is minimum, and measurement errors are minimum. For example, in the first embodiment, when the average angle $\theta_C$ is 49.2 degrees (refractive index n of the object is 1.5), the angle $\theta_A$ is 47.2 degrees, the angle $\theta_B$ is 51.2 degrees, the distance h is 100 mm, the thickness t is 100 μm, and the refractive index n is 1.5, the rate $\Delta t/t$ of change in the measured value falls within $6.4 \times 10^{-4}$ even if the object is inclined within the range of ±1 degree.

The present invention is not limited to the above embodiments. Various changes and modifications may be made within the spirit and scope of the invention. For example, the tuning fork deflector may be used in place of the stop 64 in the fourth embodiment.

What is claimed is:

1. An apparatus for measuring the thickness of an object transparent to light utilizing an interferometric method, comprising:

light-emitting means for generating a coherent light beam to which the object to be measured is transparent;

deflecting means for scanning the light beam in a predetermined angle range and generating a deflected light beam;

illuminating means for irradiating on the object to be measured the deflected light beam which is substantially parallel and which scans continuously a range of incident angle from $\theta_A$ to $\theta_B$;

light-receiving means for detecting light intensity changes caused by scanning of the incident angle and changing of the optical path difference between two light beams reflected from upper and lower surfaces of the object;

counting means for receiving an output signal from said light-receiving means and counting a difference in an order of interference fringes obtained for one scanning cycle of said deflecting means, said incident angles $\theta_A$ and $\theta_B$ being determined such that the difference in the order of interference fringes obtained for one scanning cycle of said deflecting means is at least two; and calculating means for converting an output from said counting means into a value corresponding to the thickness of the object.

2. An apparatus according to claim 1, wherein said deflecting means comprises:

a tuning fork having a mirror at a distal end thereof so as to deflect the light beam from said light-emitting means; and driving means for driving said tuning fork.

3. An apparatus according to claim 1, wherein said light-emitting means comprises a laser.

4. An apparatus according to claim 1, wherein said light-emitting means comprises LED.

5. An apparatus according to claim 1, wherein said coherent light beam comprises an s-polarized light.

6. An apparatus according to claim 1, wherein said light-receiving means comprises a photo-diode whose output is proportional to an incident light intensity.

7. An apparatus according to claim 1, wherein said counting means includes:
- a wave-forming circuit for forming an output signal from said light-receiving means into a rectangular wave signal;
- a differentiating circuit for converting the rectangular wave signal to positive- and negative-going pulses;
- an angle-detecting circuit for monitoring a phase of said deflecting means and detecting a difference between angles respectively corresponding to first and last pulses from said differentiating circuit during one scanning cycle and a total pulse number during said one scanning cycle;
- a first calculating circuit for calculating an average angle of interference fingers in accordance with an output signal from said angle-detecting circuit; and
- a second calculating circuit for calculating a difference in an order of interference fringes in accordance with the average angle of the interference fringes and a range of angle from said deflecting means during said one scanning cycle.

8. An apparatus according to claim 7, wherein said deflecting means comprises:
- a tuning fork having a mirror at a distal end thereof so as to deflect the light beam from said light-emitting means; and
- driving means for driving said tuning fork.

9. An apparatus according to claim 1, wherein said illuminating means includes means for setting the average angle of incidence of the light beam such that a maximum number of interference fringes is produced per unit angle of incidence.

10. An apparatus according to claim 1, wherein said illuminating means includes:
- means for splitting the light beam into two beam components which are incident on the surface of the object symmetrically about a normal thereto, said light-receiving means and said counting means being provided for each of the two beam components; and
- average value means for averaging output signals from said counting means and supplying an average value to said calculating means.

11. An apparatus according to claim 1, wherein said illuminating means includes a cylindrical lens arranged in an incident optical path and forming a line-focussed light beam waist on the surface of the object in a direction perpendicular to the plane of incidence.

* * * * *

UNITED STATES PATENT AND TRADEMARK OFFICE
CERTIFICATE OF CORRECTION

PATENT NO. : 4,660,980
DATED : April 28, 1987
INVENTOR(S) : H. TAKABAYASHI et al It is certified that error appears in the above-identified patent and that said Letters Patent is hereby corrected as shown below:

Title page, left-hand column, the Assignee identified as "Anritsu Electric Co., Limited" should be -- Anritsu Corporation --.

Under "References Cited": USP 3,645,625 should be -- 3,645,623 --

In The Abstract: Line 16, after "scan of" insert -- the -- .

Signed and Sealed this

First Day of March, 1988

*Attest:*

DONALD J. QUIGG

*Attesting Officer*  *Commissioner of Patents and Trademarks*